(12) United States Patent
Endle et al.

(10) Patent No.: US 8,120,854 B2
(45) Date of Patent: Feb. 21, 2012

(54) INTERFERENCE FILMS HAVING ACRYLAMIDE LAYER AND METHOD OF MAKING SAME

(75) Inventors: James P. Endle, New Richmond, WI (US); Christopher S. Lyons, St. Paul, MN (US); Douglas S. Dunn, Maplewood, MN (US); Robert J. Devoe, Minneapolis, MN (US); James M. Jonza, Woodbury, MN (US); Stephen P. Maki, North St. Paul, MN (US); Albert I. Everaerts, Oakdale, MN (US); George G. I. Moore, Afton, MN (US); Robin E. Wright, Inver Grove Heights, MN (US); Mark A. Roehrig, Stillwater, MN (US); Olester Benson, Jr., Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/857,541

(22) Filed: Sep. 19, 2007

(65) Prior Publication Data
US 2008/0160185 A1    Jul. 3, 2008

Related U.S. Application Data

(60) Provisional application No. 60/882,394, filed on Dec. 28, 2006.

(51) Int. Cl.
*G02B 5/28* (2006.01)
*B05D 5/08* (2006.01)

(52) U.S. Cl. ......... 359/589; 359/564; 428/461; 427/162

(58) Field of Classification Search .......... 359/534–536; 428/156; 525/218
See application file for complete search history.

(56) References Cited

U.S. PATENT DOCUMENTS

| | | | |
|---|---|---|---|
| 2,590,906 A | 4/1952 | Tripp | |
| 2,806,018 A * | 9/1957 | Price | 526/195 |
| 4,842,893 A | 6/1989 | Yializis et al. | |
| 5,334,686 A * | 8/1994 | Ando et al. | 526/307.7 |
| 5,549,953 A | 8/1996 | Li | |
| 5,812,317 A * | 9/1998 | Billingsley et al. | 359/536 |
| 5,877,895 A | 3/1999 | Shaw et al. | |

(Continued)

FOREIGN PATENT DOCUMENTS
TW    231925    1/2005
(Continued)

OTHER PUBLICATIONS

Rolando, T.E. "Rapra Review Reporst: Solvent-Free Adhesives". vol. 9, No. 5, (1998). p. 7.*

(Continued)

*Primary Examiner* — David Sample
*Assistant Examiner* — Prashant J Khatri
(74) *Attorney, Agent, or Firm* — Julie A. Lapos-Kuchar; Daniel R. Pastirik (57) ABSTRACT

A method for forming a color shifting film on a support, the film comprising a reflective stack disposed adjacent to the support and an image is disclosed. The reflective stack comprises an at least partially transparent spacer layer comprising a substituted acrylamide polymer disposed between a partially reflective first layer and a reflective second layer. The acrylamide layer has a thickness sufficient to produce an interference color.

21 Claims, 5 Drawing Sheets

U.S. PATENT DOCUMENTS

| | | | |
|---|---|---|---|
| 6,010,751 A | 1/2000 | Shaw et al. | |
| 6,045,864 A | 4/2000 | Lyons et al. | |
| 6,264,747 B1 | 7/2001 | Shaw et al. | |
| 6,288,842 B1 | 9/2001 | Florczak et al. | |
| 6,468,595 B1 | 10/2002 | Mikhael et al. | |
| 6,929,864 B2 | 8/2005 | Fleming et al. | |
| 7,081,282 B2 | 7/2006 | Kuntz et al. | |
| 7,140,741 B2 | 11/2006 | Fleming et al. | |
| 2004/0076802 A1 | 4/2004 | Tompkin et al. | |
| 2005/0128543 A1 | 6/2005 | Phillips et al. | |
| 2005/0162742 A1* | 7/2005 | Fleming et al. | 359/536 |
| 2005/0266239 A1* | 12/2005 | Satake et al. | 428/354 |
| 2006/0285184 A1 | 12/2006 | Phillips et al. | |

FOREIGN PATENT DOCUMENTS

| | | |
|---|---|---|
| WO | WO 01/29587 | 4/2001 |
| WO | WO 01/58989 A1 | 8/2001 |
| WO | WO 01/96115 A1 | 12/2001 |
| WO | WO 2005/038136 | 4/2005 |
| WO | WO 2005/111588 | 11/2005 |

OTHER PUBLICATIONS

Bruno, T.J. and Paris D. N. Scoronos, CRC Handbook of Fundamental Spectroscopic Correlation Charts, CRC Press (2005) p. 2.

* cited by examiner

INTERFERENCE FILMS HAVING ACRYLAMIDE LAYER AND METHOD OF MAKING SAME

CROSS-REFERENCE TO RELATED APPLICATIONS

This application claims priority to Provisional Application Ser. Nos. 60/882,394, filed Dec. 28, 2006, the disclosure of which is incorporated by reference in its entirety.

FIELD

This invention relates to formation of a multicolor interference stack on a transparent or opaque support.

BACKGROUND

Interest has developed in recent years in the protection of currency and other value documents from counterfeiting by using security devices that include interference filters. The color variations available from an interference filter cannot be duplicated by a copying machine. Interference filters are known from Tripp, U.S. Pat. No. 2,590,906. Typically, an interference filter includes a reflective stack having a reflective metal film on a smooth substrate, a transparent dielectric spacer layer atop the reflective metal layer and a partially reflective metal layer atop the spacer layer. In some cases a transparent protective coating can be applied over the reflective stack. This coating does not form part of the interference filter. The interference filter can also include an optical element, e.g., a lens or series of lenses.

When an incident light beam encounters the partially reflective layer one fraction of the light is reflected and another fraction passes through the partially reflective layer into the dielectric layer. The transmitted fraction is reflected by the reflective layer and retransmitted through the dielectric layer. A fraction of the reflected light passes through the partially reflective layer and may constructively or destructively interfere with the incoming light.

The optical thickness of the transparent dielectric spacer layer is often a small multiple of a quarter wavelength of light for constructive interference. Thus, when light is reflected from the interference filter, light of appropriate wavelength has the reflected and transmitted fractions in phase for constructive interference. Light of other wavelengths may have at least partial destructive interference. Thus, when a reflective interference filter is observed in white light, its reflection has a characteristic color.

The color reflected from the filter depends on the effective optical thickness of the interference filter. When the filter is observed with light at normal incidence, a certain color, e.g., blue, is seen. When the angle of incidence and reflection from the interference filter is more acute, the effective optical thickness is shorter. Thus, when the interference filter is observed at an angle nearer grazing incidence, a shorter wavelength color, for example purple, is observed. The characteristic change of color is thus dependent on the viewing angle.

In some instances the security device can include an image, an optical element, or both. The device can be designed so that the image will only be visible at predetermined observation angles. The resulting effects can provide useful features including evidence of tampering, security authentication or positional information. For example, the visibility and conspicuity of an object can be enhanced by making the color of the light dependent on information about the object, such as its orientation to the light source and the object's color shifting properties.

Dielectric spacer layers used in interference filters have been prepared from acrylate monomers. The spacer layer may require a pretreatment or a primer between the spacer layer and the reflective metal layers to obtain sufficient bonding strength between the layers. There is a need for dielectric layers that have improved bond strength with the metal layer(s) and which require no pretreatment or a minimum number of pretreatment steps.

DISCLOSURE OF INVENTION

The present application provides a color shifting film comprising a support, a reflective stack disposed adjacent to the support and an image. The reflective stack comprises an at least partially transparent spacer layer comprising an N-substituted (meth)acrylamide polymer disposed between a partially reflective first layer and a reflective second layer. The (meth)acrylamide layer has a thickness sufficient to produce an interference color. The film can optionally include an optical element.

In another aspect, the invention provides a method for forming a color shifting film, which method comprises providing a support, forming a reflective stack on the support and forming an image visible when viewing the stack. The reflective stack is prepared by depositing a first layer that is reflective or partially reflective on the support, depositing an at least partly transparent spacer layer comprising an N-substituted (meth)acrylamide polymer atop the first layer, and depositing a second layer that is partially reflective or reflective atop the spacer layer. The reflective stack has a thickness sufficient to produce an interference color. The film can optionally include an optical element.

The disclosed films can be used in a variety of applications such as tamperproof images in value documents (e.g., currency, credit cards, stock certificates, etc.), driver's licenses, government documents, passports, ID badges, event passes, affinity cards, commercial product identification formats and advertising promotions for verification or authenticity, e.g., tape cassettes, playing cards, beverage containers, brand enhancement images which can provide a floating or sinking or a floating and sinking image of the brand, information presentation images in graphics applications such as kiosks, night signs and automotive dashboard displays, and novelty enhancement through the use of composite images on products such as business cards, hang-tags, art, shoes and bottled products.

These and other aspects of the invention will be apparent from the accompanying drawings and this specification. In no event, however, should the above summaries be construed as limitations on the claimed subject matter, which subject matter is defined solely by the attached claims, as may be amended during prosecution.

DETAILED DESCRIPTION

The words "a", "an", and "the" are used interchangeably with "at least one" to mean one or more of the elements being described. By using words of orientation such as "atop", "on", "covering", "uppermost", "underlying" and the like for the location of various elements in the disclosed coated films, we refer to the relative position of an element with respect to a horizontally-disposed, upwardly-facing support. It is not intended that the films or articles should have any particular orientation in space during or after their manufacture.

The term "polymer" includes homopolymers and copolymers, as well as homopolymers or copolymers that may be formed in a miscible blend, e.g., by coextrusion or by reaction, including, e.g., transesterification. The term "copolymer" includes both random and block copolymers.

The term "crosslinked" polymer refers to a polymer in which the polymer chains are joined together by covalent chemical bonds, usually via crosslinking molecules or groups, to form a network polymer. A crosslinked polymer is generally characterized by insolubility, but may be swellable in the presence of an appropriate solvent.

The term "metal" includes a pure metal or a metal alloy.

Figure 1:
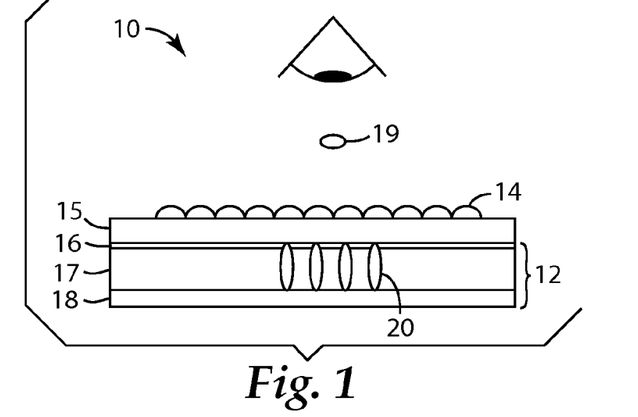
FIGS. 1-4 are cross sectional diagrams of color shifting (interference) films wherein the films have embedded image and an optional lens array.

An example of a security article is illustrated in FIG. 1 which is a cross-sectional schematic diagram of a portion of a color shifting film 10. The multi-layer interference coating (3 layer stack) 12 may be referred to as a Fabry-Perot reflector. The color shifting film 10 includes an optional optical element in the form of a microlens array 14. Reflective stack 12 is disposed on support 15 in optical communication with the array, 14. As used herein, the term "optical communication" refers to the reflective stack 12 being positioned relative to the optical element such that a significant portion of light transmitted through the optical element can strike the reflective stack 12 and be reflected back into optical element. The reflective stack includes a partially reflective first metal layer 16, a partially transparent spacer layer 17 and a reflective second metal layer 18. A virtual image 19 appearing above the plane of image 20 can be viewed by an observer.

The optional optical element can include a series of lenses, e.g., a lens array 14 as illustrated in FIG. 1 or a single lens (not shown in FIG. 1). Article 10 may be referred to as an "exposed lens" article, one where the optical element is exposed to the ambient environment, air. Optionally, a cover layer (not shown) may be disposed over at least a portion of the microlens array 14 opposite the reflective stack 12 such that the cover layer encloses or encapsulates the microlens array 14 to form an "enclosed lens" article in which the optical element is embedded in the cover layer or "encapsulated lens" article in which the optical element and cover layer form one or more sealed air pockets in the optical path. The optional optical element can serve as the support.

Examples of optical elements include but are not limited to plano-convex lenses having one spherical and one flat surface, lens arrays such as microreplicated lenses having a uniform repeating pattern of small (e.g., millimeter scale or less) lenses, fresnel lenses, cylindrical lenses and the like.

Figure 2:
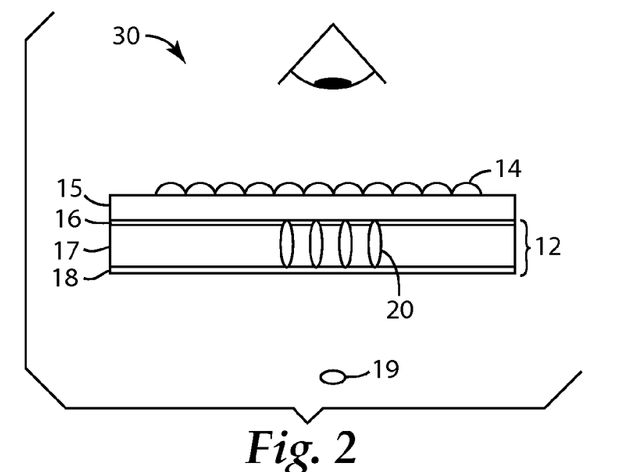

In FIG. 2, another color shifting film is shown generally at 30. Film 30 resembles film 10, but has virtual image 19 appearing below the plane of image 20.

Figure 3:
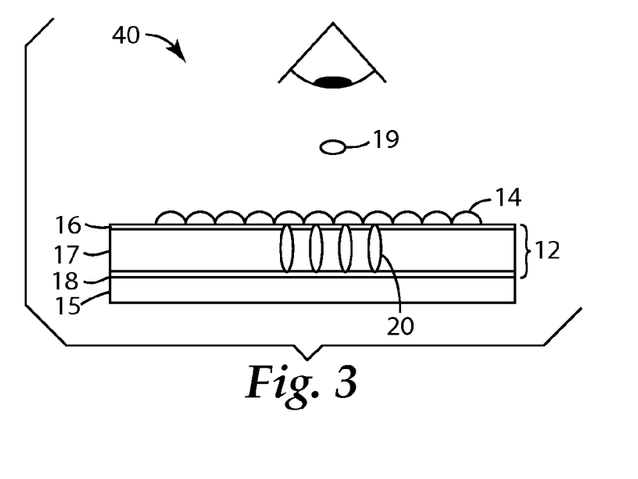

In FIG. 3, another color shifting film is shown generally at 40. Film 40 resembles film 10, but has the reflective stack 12 disposed between optional microlens array 14 and support 15. A virtual image 19 appearing above the plane of image 20 can be viewed by an observer.

Figure 4:
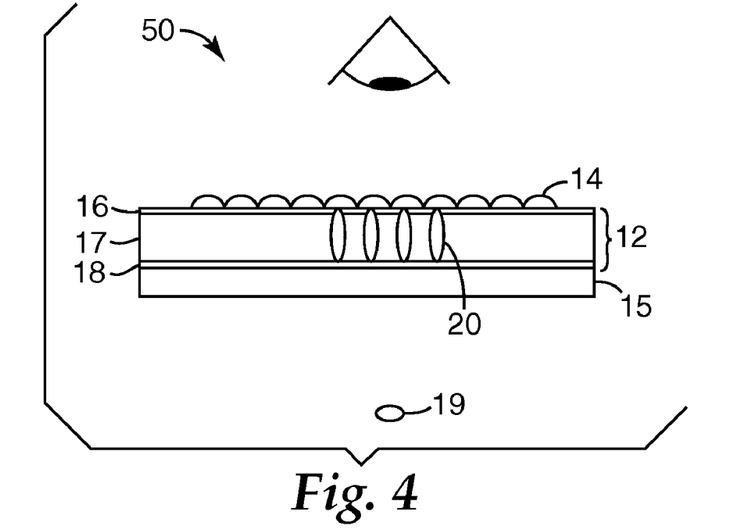

In FIG. 4, another color shifting film is shown generally at 50. Film 50 resembles film 40, but has virtual image 19 appearing below the plane of image 20.

Figure 5:
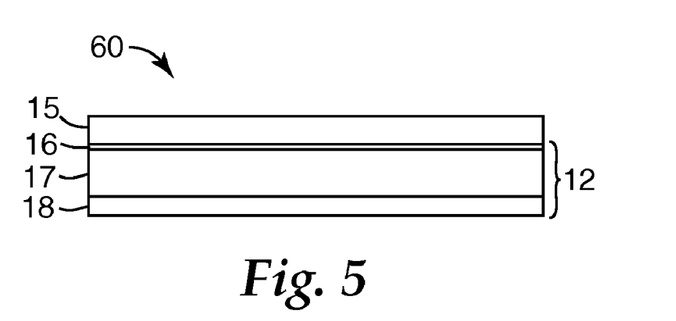
FIG. 5 is a cross sectional diagram of color shifting film prepared in Example 1, and having a poly(4-acryloylmorpholine) spacer layer.

FIG. 5 is a cross-sectional schematic diagram of a color shifting film 60. The color shifting film 60 includes a reflective stack 12 disposed on support layer 15. The reflective stack 12 includes a partially reflective first layer 16, a partially transparent spacer layer 17 and a reflective second layer 18.

Figure 6:
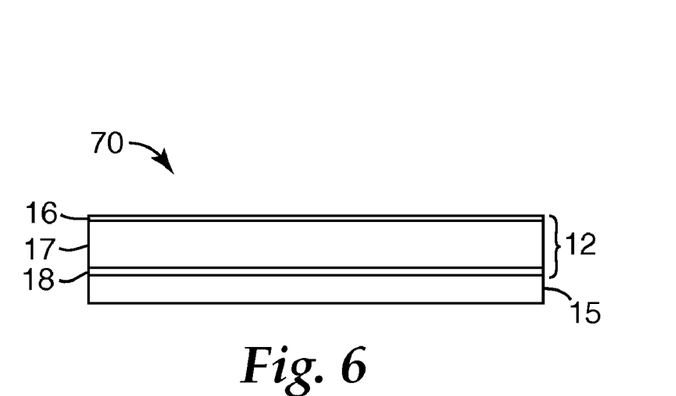
FIG. 6 is a cross sectional diagram of color shifting film prepared using a opaque support.

In FIG. 6, another color shifting film is shown generally at 70. Film 70 resembles film 60, but uses an opaque support 15.

In FIGS. 7A-7D reflectance spectra from films prepared in Examples 1-4 are shown. These spectra show increasing reflectance peaks due to increased monomer delivery and therefore increased spacing layer thickness of the polymer spacing layer.

Figure 8:
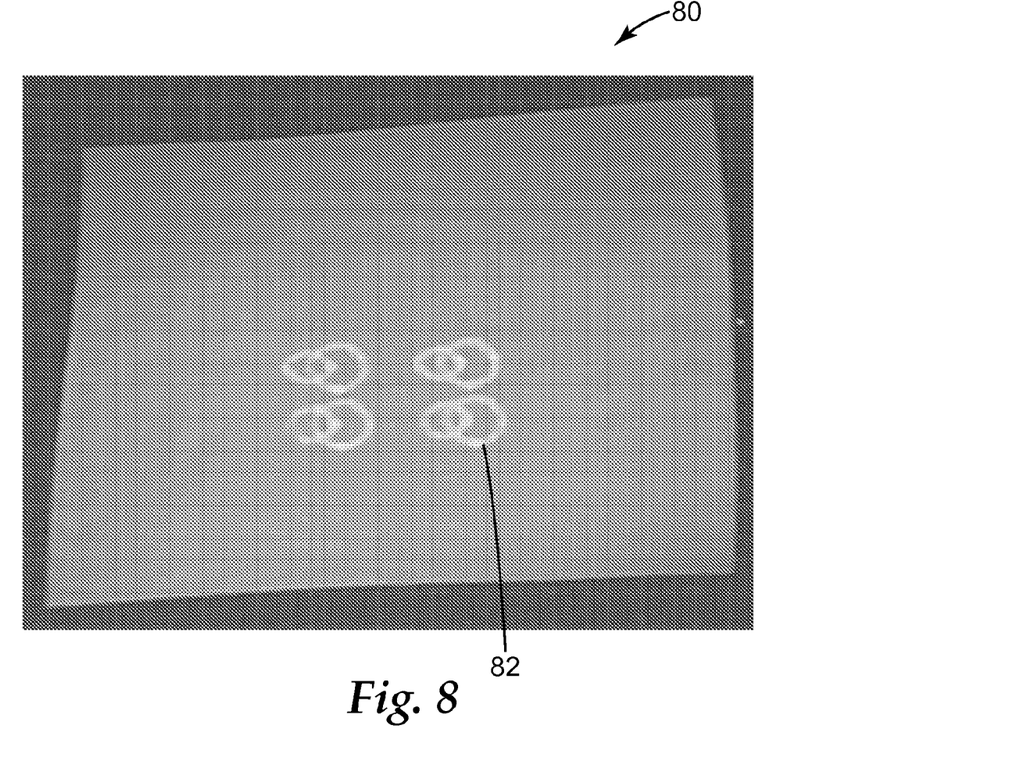
FIG. 8 is an illustration of an image prepared in an interference film stack.

In FIG. 8 a color shifting film prepared in Example 5 is shown at 80. The film has an image 82, in the film. The actual size of each image is about 10 mm.

Figure 9:
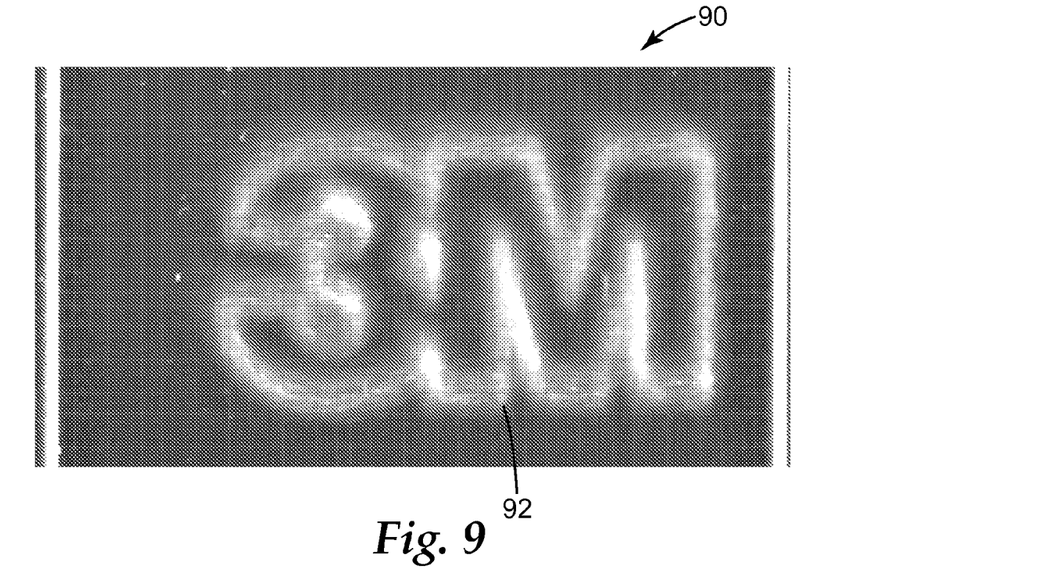
FIG. 9 is an illustration of a virtual image prepared in an interference film stack.

In FIG. 9 a color shifting film prepared in Example 6 is shown at 90. The film has a floating image 92, in the film. The actual size of the image is about 11 mm.

The partially reflective first layer 16 transmits some incident light. This partially reflective layer may, for example, have a physical thickness of about 2 to about 50 nm, light transmission at 500 nm of about 20 to about 80%, and reflectance at 500 nm of about 80 to about 20%. The reflective second layer 18 can be a partially reflective layer as described above, more reflective, for example having a light transmission at 500 nm of about 80 to about 0%, and reflectance at 500 nm of about 20% to about 100%. Reflective stack 12 can have a physical thickness of about 10 nm to about 1700 nm.

A variety of visible light-transmissive supports can be employed. In one embodiment, the supports have a visible light transmission of at least about 70% at 550 nm. Exemplary supports are flexible plastic materials including thermoplastic films such as polyesters (e.g., polyethylene terephthalate (PET) or polyethylene naphthalates), polyacrylates (e.g., polymethyl methacrylate), polycarbonates, polypropylenes, high or low density polyethylenes, polysulfones, polyether sulfones, polyurethanes, polyamides, polyvinyl butyral, polyvinyl chloride, polyvinylidene difluoride and polyethylene sulfide; and thermoset films such as cellulose derivatives, polyimide, polyimide benzoxazole and polybenzoxazole. In one embodiment, the films can be prepared on a support including PET. The support can have a thickness of about 0.01 to about 1 mm. The support may, however, be considerably thicker, for example, when a self-supporting article is desired. Such films or articles can conveniently also be made by laminating or otherwise joining a color shifting film made using a flexible support to a thicker, inflexible or less flexible supplemental support.

The smoothness and continuity of the film can be enhanced by appropriate pretreatment of the support. In one embodiment, the pretreatment regimen involves electrical discharge pretreatment of the support in the presence of a reactive or non-reactive atmosphere (e.g., plasma, glow discharge, corona discharge, dielectric barrier discharge or atmospheric pressure discharge), chemical pretreatment or flame pretreatment. These pretreatments can help ensure that the surface of the support will be receptive to the subsequently applied layers. A specific embodiment, involves plasma pretreatment.

Non-limiting examples of suitable metals for the reflective layers include elemental metals and metal alloys. Examples of suitable metals include elemental chromium, nickel, titanium, aluminum, silver, zirconium, hafnium, niobium, tantalum, molybdenum, tungsten, cobalt, palladium and the like. For example, chromium may be used to form a partially reflective layer and aluminum may be used to form a reflective layer. Alloys, e.g., nickel-chromium alloy can also be employed. The partially reflective layer 16 and the reflective layer 18 can be formed by deposition on the support or spacer layer (or vice-versa), using techniques employed in the film metallizing art such as vacuum metallization, sputter coating (e.g., cathode or planar magnetron sputtering), evaporation (e.g., resistive or electron beam evaporation), chemical vapor deposition (CVD), plasma enhanced CVD (PECVD), plating and the like. These and other suitable techniques will be familiar to those skilled in the art.

Spacer layer 17 may be formed using any suitable technique, e.g., evaporation, plasma deposition, solution coating, extrusion coating, gravure coating, or spray coating. These and other suitable techniques will be familiar to those skilled in the art. The desired thickness of the spacer layer will depend in part on the nature of the support and the desired purpose of the color shifting film. The spacer layer may be crosslinked in situ after it is applied, using methods familiar to those skilled in the art, for example, UV radiation, heat, plasma, or electron beam. In one embodiment, the spacer layer is formed by evaporation of a monomer or oligomer, vapor deposition, polymerization and optional crosslinking of the monomer. In a specific embodiment, volatilizable N-substituted (meth)acrylamides monomers are employed. Exemplary N-substituted (meth)acryl-amides) will have a molecular weight that is sufficiently low to allow flash evaporation and sufficiently high to permit condensation on the support. Coating efficiency can be improved by cooling the support.

Exemplary N-substituted (meth)acrylamides include (meth)acrylamides having one or two groups substituted on the nitrogen atom. The N-substituted (meth)acrylamides have the general formula:

wherein each $R^1$ is hydrogen, $(C_1-C_{20})$alkyl, $(C_2-C_{20})$alkenyl, $(C_3-C_{12})$cycloalkyl, $(C_6-C_{10})$aryl, or $(C_7-C_{30})$arylalkyl and $R^2$ is hydrogen or methyl. The $R^1$ groups can be the same or different (e.g., instead of two methyl groups, one $R^1$ group could be ethyl and the other $R^1$ group could be methyl). The $R^1$ groups can independently have straight chains or branched chains and independently can be optionally interrupted with a hetero atom, e.g., oxygen, sulfur or nitrogen. The two $R^1$ groups can form a ring together with the nitrogen atom to which they are attached. Exemplary $R^1$ groups include methyl, ethyl, propyl, butyl. The $R^1$ groups can be optionally substituted with halo groups or polyethylene glycol groups. Exemplary halo groups include fluorine. Non-limiting examples of suitable N-substituted acrylamides include tertiary N-substituted acrylamides such as N,N-dimethylacrylamide, N,N-diethylacrylamide, N,N-dipropylacrylamide, N,N-dibutylacrylamide, N-ethyl-N-methylacrylamide, 4-acryloylmorpholine and the like, secondary N-substituted acrylamides such as N-('butoxymethyl)acrylamide, N-(butoxymethyl)acrylamide, N-(allyloxymethyl)acrylamide, N-(isopropoxymethyl)-acrylamide, N-propoxymethylacrylamide, N-ethoxymethylacrylamide, N-(methoxymethyl)acrylamide, N-propylacrylamide, N-isopropylacrylamide, N-butylacrylamide, N-isobutylacrylamide, N-decylacrylamide, (N-[3-(N,N-dimethylamino)-propyl]acrylamide), (N-[3-(N,N-diethylamino)propyl]acrylamide), (N-[3-(N-ethyl-N-methylamino)butyl]acrylamide), N-{2,3,3,3-tetrafluoro-2-[1,1,2,3,3,3-hexafluoro-2-(1,1,2,2,3,3,3-heptafluoro-propoxy)-propoxy]-propyl}-acrylamide, and the like. Non-limiting examples of suitable N-substituted cyclic acrylamides include 1-morpholin-4-yl-propenone, 1-piperidin-1-yl-propenone, 1-pyrrolidin-1-yl-propenone, and the like.

The N-substituted acrylamides provide a strong polymer-metal bond between the metal reflective layers and the spacer layer. The strength of this bond can make it unnecessary to employ adhesion additives (often used when acrylate spacer layers are employed) to obtain sufficient bonding strength between the layers.

The image can be formed by a variety of methods known in the art including etching, printing, or photographic techniques. Exemplary etching techniques include laser etching, abrasive and chemical etching. Exemplary printing techniques include screen printing, inkjet printing, thermal transfer printing, letterpress printing, offset printing, flexographic printing, stipple printing, laser printing, and so forth, using a variety of inks, including one and two component inks, oxidatively drying and UV-drying inks, dissolved inks, dispersed inks, and 100% solid ink systems. Exemplary photographic techniques include positive and negative photographic imaging and development. The image can be applied to the support, spacer layer or one or both of the reflective layers prior to the formation of any subsequent layer(s), or the image can be imprinted into the completed reflective stack using techniques like those disclosed in U.S. Pat. No. 6,288,842. The image should be formed such that it may be viewed or illuminated through the reflective stack. Images may be formed so as to have a restricted viewing angle. In other words, the image would only be seen if viewed from a particular direction, e.g., at normal incidence or at minor angular variations from the chosen direction. The image can be made to appear to be suspended, or float, above, in the plane of, or below the film.

Although FIGS. 1-6 illustrate the reflective layers, partially reflective first layer 16 or reflective layer 18 as being positioned on and in contact with support 15, one or more additional layers may be positioned between layers 16 or 18 and the support 15. In addition, although FIGS. 1-6 illustrate the reflective second layer 18 as being positioned in contact with the spacer layer 17, one or more additional reflective or spacer layers may be positioned between layer 18 and spacer layer 17. The additional reflective layers may also include any suitable metal or metals, e.g., aluminum, chromium, nickel, nickel-chromium alloy, stainless steel, and silver, may also be formed from two or more layers each containing one or more inorganic or organic materials having refractive indices that differ sufficiently so as to reflect light. Thus, in some embodiments, first layer 16 or second layer 18 may have a single layer, in other embodiments, first layer 16 or second layer 18 may have multiple layers. The reflective second layer 18 may be substantially opaque, e.g., fully reflective such that its reflectance will not increase with increasing thickness. Layer 18 may have a thickness that is at least about 2 nm. In some embodiments, the layer 18 may have a thickness of about 2 nm to about 200 nm. Further details regarding formation of such metal layers may be found in U.S. Pat. No. 6,929,864.

The layers of reflective stack 12 may be applied to a support in any convenient order depending upon the design or viewing angle of the image in the final article. For example, if a support is opaque the stack can be formed atop the support, and the image, applied on the support or within reflective stack 12, may be viewed from above. In another embodiment, the support may be transparent and the reflective stack applied such that the image can be illuminated through the support.

Various functional layers can be added to the disclosed films to alter or improve their physical or chemical properties, particularly at one of the surfaces of the film. Such layers or coatings can include, for example, low friction coatings or slip particles to make the film easier to handle during the manufacturing process; adhesives such as pressure sensitive adhesives or hot melt adhesives; and low adhesion backsize materials for use when the film is packaged in adhesive roll form. The functional layers or coatings can also include anti-intrusion or puncture-tear resistant films and coatings, for example, the functional layers described in published PCT Application No. WO 01/96115. Anti-intrusion or puncture-tear resistant features can be incorporated into one or both outermost layers of the film, or they can be provided by a separately-applied film or coating.

For some applications, it may be desirable to alter the appearance or performance of the film, such as by laminating a dyed film layer to the color shifting film, applying a pigmented coating to the surface of the color shifting film, or including a dye or pigment in one or more of the materials used to make the color shifting film. The dye or pigment can absorb in one or more selected regions of the spectrum, including portions of the infrared, ultraviolet or visible spectrum. The dye or pigment can be used to complement the properties of the color shifting film. A particularly useful pigmented layer that can be employed in the color shifting films is described in published PCT Application No. WO 2001/58989. This layer can be laminated, extrusion coated or co-extruded as a skin layer on the films. The pigment loading level can be varied, e.g., between about 0.01 and about 2% by weight, to vary the visible light transmission as desired. If very thin layers are used then the pigment level can be higher. The addition of a UV absorptive cover layer can also be desirable in order to protect any inner layers of the film that may be unstable when exposed to UV radiation. Other functional layers or coatings that can be added to the color shifting film include an optional layer or layers to make the film more rigid. The rigidifying layer or layers do not interfere with the function of the reflective stack or if in the normal light path desirably do not block light. The uppermost layer of the film is optionally a suitable protective layer. If desired, the protective layer can be applied using conventional coating methods such as roll coating (e.g., gravure roll coating) or spray coating (e.g., electrostatic spray coating), then crosslinked using, for example, UV radiation. The protective layer can be formed by flash evaporation, vapor deposition and crosslinking of a monomer as described above. Volatilizable (meth) acrylate monomers are suitable for use in such a protective layer. In a specific embodiment, volatilizable acrylate monomers are employed.

The invention is further illustrated in the following examples, in which all parts, percentages and ratios are by weight unless otherwise indicated. Unless otherwise noted, all solvents and reagents were obtained from Aldrich Chemical Company, Milwaukee, Wis.

EXAMPLE 1

Interference Film Formed With
4-Acryloylmorpholine Monomer

Figure 7A:
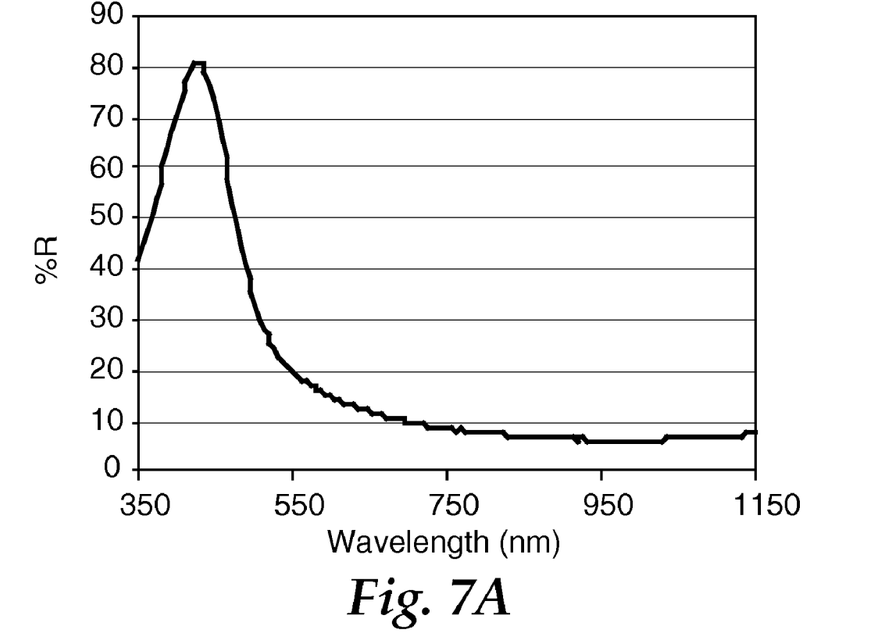
FIGS. 7A-7D are reflectance spectra from the films prepared in Examples 1-4.

A polyester web (PET) was primed using a $N_2$ 400 kHz RF Plasma, 600 watts power and 84 W reflected power, 300 mTorr $N_2$ and a line speed of about 15.3 m/min (50.0 ft/min) at 60° F. Chromium was deposited by DC sputtering in argon at 4.0 kw (480 volts and 8.3 amps), chamber pressure 2.0 mTorr and a line speed of about 6.1 m/min (20.0 ft/min), to provide a layer with a thickness of approximately 4.7 nm. A monomer solution of degassed 4-acryloylmorpholine (degassed for ~25 minutes in a vacuum bell jar) containing 3 wt % of DAROCUR™ 1173, Ciba Specialty Chemicals, Basel Switzerland was prepared and a 22 mL portion of the solution was loaded into a syringe. A syringe pump was used to pump the solution into an ultrasonic atomizer. After atomization, the solution was flash evaporated at a temperature of about 275° C. The monomer mixture was condensed on the chromium layer at a line speed of about 21.3 m/min. and a monomer delivery feed rate of 1.0 mL/min. The condensed coating was cured using germicidal UV bulbs. Nine bulbs (model G24T6VH, obtained from Atlantic Ultraviolet Corp., Hauppauge, N.Y.) were used, arranged in 3 sets of 3 bulb reflectorized arrays. The bulbs were about 1 inch from the film surface. In the same pass as monomer condensation and polymerization, the polymer surface was primed with a $N_2$ DC plasma (Cr electrode) at 1000 W, 305V, 3.3 A at 21.34 m/min (70 ft/min). After appropriate pumpdown, aluminum was deposited by DC sputtering in argon at 8 kW (voltage 520 volts and 15.4 amps), chamber pressure 1.6 mTorr and a line speed of about 3.2 m/min (10.5 ft/min), to provide a layer with a thickness of approximately 70 nm. The structure of the resulting film is illustrated in FIG. 2. The reflectance spectrum obtained using a Perkin-Elmer Lambda 900 Spectrometer is shown in FIG. 7A.

EXAMPLE 2

Interference Film Formed With
4-Acryloylmorpholine Monomer

Figure 7B:
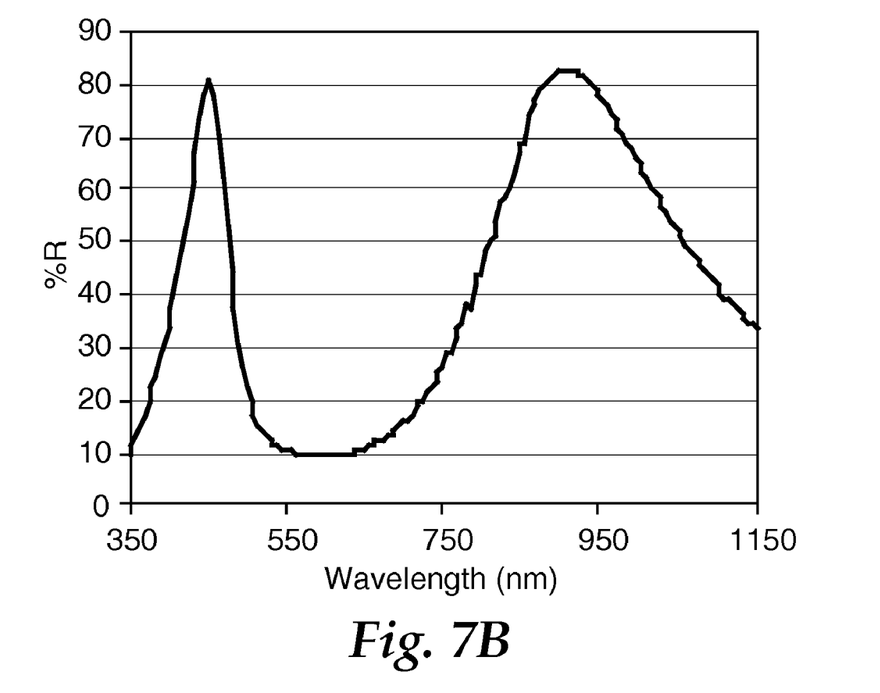

Using the procedure of Example 1, a film was prepared using a line speed of about 9.5 m/min. and a monomer delivery feed rate of 1.0 mL/min. The plasma during the monomer pass was 600 W, 290V, 2.1 A. A reflectance spectrum for the film is shown in FIG. 7B.

EXAMPLE 3

Interference Film Formed With
4-Acryloylmorpholine Monomer

Figure 7C:
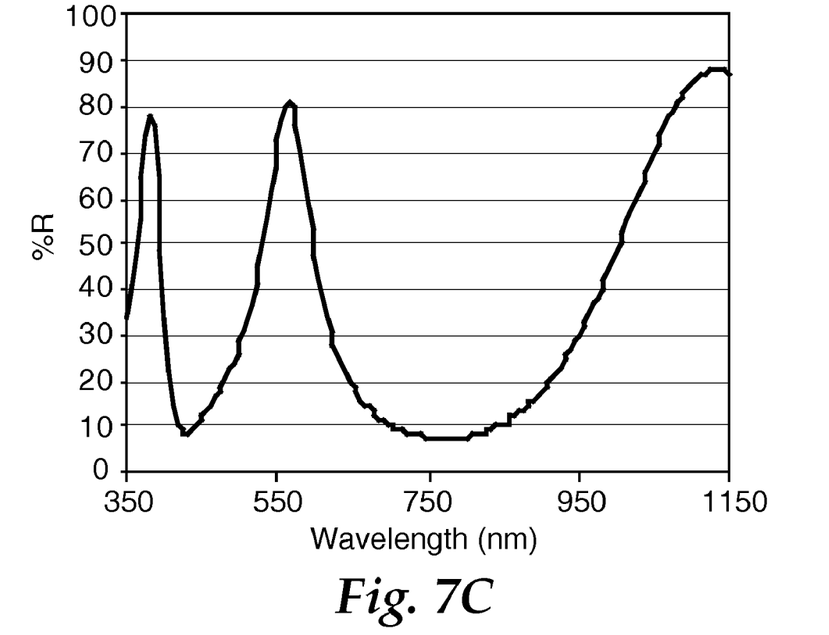

Using the procedure of Example 1, a film was prepared using a line speed of about 7.8 m/min. and a monomer delivery feed rate of 1.0 mL/min. The plasma during the monomer pass was 600 W, 290V, 2.1 A. The reflectance spectrum for the film is shown in FIG. 7C.

EXAMPLE 4

Interference Film Formed With
4-Acryloylmorpholine Monomer

Figure 7D:
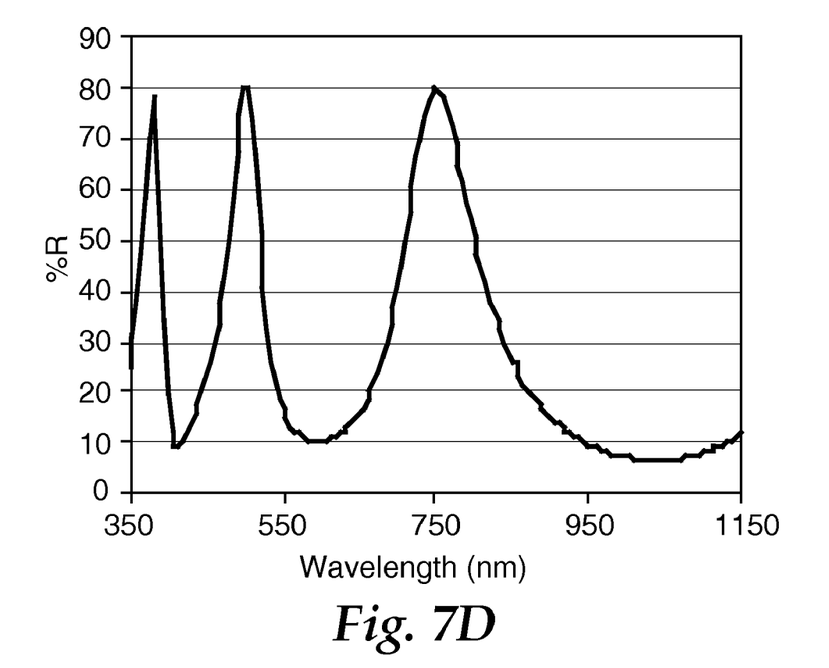

Using the procedure of Example 1, a film was prepared using a line speed of about 6 m/min. and a monomer delivery feed rate of 1.0 mL/min. The plasma during the monomer pass was 600 W, 290V, 2.1 A. The reflectance spectrum from 350 to 1150 nm for the film is shown in FIG. 7D.

The various monomer coating conditions and results for Examples 1-4 are provided in Table 3

TABLE 3

Monomer coating conditions and resulting thickness

| Example | Line Speed (m/min.) | Monomer Feed Rate (mL/min) | Approximate Thickness (nm) |
|---|---|---|---|
| 1 | 21.3 | 1.0 | 132 |
| 2 | 9.5 | 1.0 | 298 |
| 3 | 7.8 | 1.0 | 363 |
| 4 | 6 | 1.0 | 472 |

The reflectance spectra, FIGS. 7A-7D, show that decreasing line speeds, sequentially from Examples 1 to 4 created thicker spacing layers as indicated from the increased number of reflectance peaks. The different approximate polymer thicknesses are reported in Table 3. The colors that appeared from each interference film at normal incidence were as follows, the Example 1 film appeared Blue, the Example 2 film appeared Purple, the Example 3 film appeared Green and the Example 4 film appeared Magenta.

EXAMPLE 5

Imaging

An interference film stack was prepared on a PET support using the procedure of Example 1 on a PET support. The film stack had a 4-acryloylmorpholine spacer layer with a thickness of about 345 nm and the interference film stack appeared bluish/green at normal incidence. An image was created in the film stack using a Model IB Laser available from AZURA LASER AG, Berlin, Germany. The conditions were as follows: repetition rate frequency 1 kHz, pulsewidth 7 ns, pulse energy 0.01 mJ, average power about 10 mW, a laser spot size about 0.5 mm, and a draw speed of 100 mm/s. The image is illustrated in FIG. 8. The actual size is about 10 mm.

EXAMPLE 6

Virtual Image Sample

An interference film stack was prepared using the procedure of Example 1 on a support having a micro-lens array. The lenses were 30 microns in diameter having 34 micron pitch. The focal point of the lenses was about 64 microns from the lens apex. The film stack had a 4-acryloylmorpholine spacer layer with a thickness of about 239 nm and the interference film stack appeared violet at normal incidence. A "3M" image was created in the film stack at a float height of about 6 mm using the procedure described in U.S. Pat. No. 6,288,842, using a Model IB Laser. The conditions were as follows: repetition rate 1 kHz frequency, pulsewidth 6 ns, pulse energy 0.053 mJ, average power about 0.053 W and draw speed 200 cm/s. The image is illustrated in FIG. 9. The actual size is about 11 mm.

EXAMPLE 7

Strength Testing

A sample film from Example 1 was scored through the aluminum layer to the polyester support in a cross-hatched pattern with a razor. A piece of tape (4-5 inches in length "Scotch Magic Tape" type 810; 0.75 inches wide, available from 3M Corporation, St. Paul, Minn.) was adhered over the scored aluminum surface layer (with no air bubbles, and with a folded tab at one end). The tape was rolled 3 times, using a rubber roller and moderate pressure, across the length of the tape. The tape was pulled off at 180 degrees using the folded tab. No aluminum or other coating was detected on the tape. The sample was compared to similarly prepared interference film having an acrylate layer in place of the acrylamide layer. The test resulted in significant removal of the aluminum layer.

All references cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure and the claims shown below are not limited to the illustrative embodiments set forth herein.

We claim:

1. A color shifting film comprising:
   a support;
   a reflective stack disposed adjacent to the support; wherein the reflective stack comprises an at least partially transparent spacer layer comprising a homopolymer of a substituted acrylamide disposed between a partially reflective first layer and a reflective second layer;
   an optical element selected from a plano-convex lens or a lens array; and an image;
   wherein the transparent spacer layer has a maximum thickness of $10\lambda/n$, wherein $\lambda$ is a wavelength in the range of 380 nm to 750 nm and n is the index of refraction of the at least partially transparent spacer layer.

2. The film of claim 1 wherein the partially reflective first layer is in contact with the support.

3. The film of claim 1 wherein the reflective second layer is in contact with the support.

4. The film of claim 1 wherein the reflective second layer is fully reflective.

5. The film of claim 1 wherein both reflective layers are partially reflective.

6. The film of claim 1 wherein the second reflective layer comprises layers of materials having differing refractive indices.

7. The film of claim 1 wherein the homopolymer of a substituted acrylamide comprises N,N-dimethylacrylamide, N,N-diethylacrylamide, N,N -dipropylacrylamide, N,N-dibutylacrylamide, N-ethyl-N-methylacrylamide, N-(isobutoxy -methyl)acrylamide, N-(butoxymethyl)acrylamide, N-(allyloxymethyl)acrylamide, N -(isopropoxymethyl)acrylamide, N-propoxymethyl-acrylamide, N-ethoxymethyl -acrylamide, N-(methoxymethyl)acrylamide, N-propylacrylamide, N-isopropylacrylamide, N-butylacrylamide, N-isobutylacrylamide, N-decylacrylamide (N-[3-(N,N-dimethyl -amino)propyl]acrylamide), (N-[3-(N,N-diethylamino) propyl]acrylamide), (N-[3-(N-ethyl -N-methylamino)butyl] acrylamide), N-{2,3,3,3-tetrafluoro-2-[1,1,2,3,3,3-hexafluoro-2-(1,1,2,2,3,3,3-heptafluoro-propoxy)-propoxy]-propyl}-acrylamide, 1-morpholin-4-yl-propenone, 1-piperidin-1-yl-propenone, or 1-pyrrolidin-1-yl -propenone.

8. The film of claim 7 wherein the homopolymer of a substituted acrylamide comprises, 1-morpholin-4-yl-propenone, 1-piperidin-1-yl -propenone, or 1 -pyrrolidin-1-yl-propenone.

9. The film of claim 8 wherein the homopolymer of a substituted acrylamide comprises 1-morpholin-4-yl-propenone.

10. The film of claim 1 wherein the lens array is an exposed lens array.

11. The film of claim 1 wherein the lens array is an embedded or encapsulated lens array.

12. The film of claim 1 wherein the optical element serves as the support.

13. The film of claim 1 further comprising a dyed film layer.

14. The film of claim 1 further comprising a protective layer of crosslinked polymer atop the film.

15. A method for forming a color shifting film on a polymer support, which method comprises:
forming a reflective stack disposed adjacent to the support by:
depositing a reflective or partially reflective first layer adjacent the support,
depositing an at least partly transparent spacer layer comprising a homopolymer of a substituted acrylamide on the reflective first layer,
depositing a partially reflective or reflective second layer on the spacer layer; and
forming an image;
wherein the reflective stack has a maximum thickness of 10 $\lambda/n$, wherein $\lambda$ is a wavelength in the range of 380 nm to 750 nm and n is the index of refraction of the at least partially transparent spacer layer;
and wherein the support comprises an optical element selected from a plano-convex lens or a lens array.

16. The method of claim 15 comprising forming a fully reflective second layer.

17. The method of claim 15 wherein both reflective stacks are partially reflective.

18. A color shifting film comprising:
a support;
a reflective stack disposed adjacent to the support; wherein the reflective stack comprises an at least partially transparent spacer layer consisting essentially of a substituted acrylamide polymer disposed between a partially reflective first layer and a reflective second layer;
an optical element selected from a plano-convex lens or a lens array; and
an image;
wherein the transparent spacer layer has a maximum thickness of 10 $\lambda/n$, wherein $\lambda$ is a wavelength in the range of 380 nm to 750 nm and n is the index of refraction of the at least partially transparent spacer layer.

19. The film of claim 18, wherein the partially reflective first layer is in contact with the support.

20. The film of claim 18 wherein the reflective second layer is in contact with the support.

21. The film of claim 18 wherein the substituted acrylamide comprises N,N-dimethylacrylamide, N,N-diethylacrylamide, N,N-dipropylacrylamide, N,N-dibutylacrylamide, N-ethyl-N-methylacrylamide, N-(isobutoxymethyl)acrylamide, N-(butoxymethyl)acrylamide, N-(allyloxymethyl)acrylamide, N-(isopropoxymethyl)acrylamide, N-propoxymethyl-acrylamide, N-ethoxymethyl-acrylamide, N-(methoxymethyl)acrylamide, N-propylacrylamide, N-isopropylacrylamide, N-butylacrylamide, N-isobutylacrylamide, N-decylacrylamide (N[3-(N,N-dimethyl-amino)propyl]acrylamide), (N[3-(N,N-diethylamino)propyl]acrylamide), (N-[3-(N-ethyl-N-methylamino)butyl]acrylamide), N-{2,3,3,3-tetrafluoro-2-[1,1,2,3,3,3-hexafluoro-2-(1,1,2,2,3,3,3-heptafluoro-propoxy)-propoxy]-propyl}-acrylamide, 1-morpholin-4-yl-propenone, 1-piperidin-1-yl-propenone, 1-pyrrolidin-1-yl-propenone or a mixture thereof.

* * * * *

UNITED STATES PATENT AND TRADEMARK OFFICE
CERTIFICATE OF CORRECTION

PATENT NO. : 8,120,854 B2  
APPLICATION NO. : 11/857541  
DATED : February 21, 2012  
INVENTOR(S) : Endle et al.

Page 1 of 1

It is certified that error appears in the above-identified patent and that said Letters Patent is hereby corrected as shown below:

First Page, Column 2 (Others Publications)
Line 1, delete "Reporst:" and insert in place thereof -- Reports: --.

Column 5
Line 33 (Approx.), Delete "(meth)acryl-amides)" and insert in place thereof -- (meth)acrylamides --.

Column 6
Line 1, Delete "N-('butoxymethyl)acrylamide," and insert in place thereof
-- N-(butoxymethyl)acrylamide, --.

Signed and Sealed this
Eighth Day of May, 2012

David J. Kappos
*Director of the United States Patent and Trademark Office*